United States Patent [19]
Curhan et al.

[11] Patent Number: 5,187,349
[45] Date of Patent: Feb. 16, 1993

[54] DEFROST AND PASSENGER COMPARTMENT HEATER SYSTEM

[75] Inventors: Jeffery A. Curhan, Medway; Daniel R. Pimentel, Seekonk; Peter G. Berg, Attleboro Falls, all of Mass.

[73] Assignee: Texas Instruments Incorporated, Dallas, Tex.

[21] Appl. No.: 571,374

[22] Filed: Aug. 22, 1990

[51] Int. Cl.⁵ .................................................. B60L 1/02
[52] U.S. Cl. ..................................... 219/202; 219/203; 237/2 A
[58] Field of Search ............. 237/2 A, 12.3 A, 12.3 B; 165/41, 42, 16; 219/202, 203

[56] References Cited

U.S. PATENT DOCUMENTS

| | | | |
|---|---|---|---|
| 2,088,617 | 8/1937 | Sola | 219/39 |
| 3,264,450 | 5/1962 | Wallace et al. | 219/279 |
| 3,658,244 | 4/1972 | Caldwell | 237/2 A |
| 3,868,559 | 2/1975 | Hill et al. | 320/61 |
| 4,692,684 | 9/1987 | Schaeffer | 322/90 |
| 4,738,396 | 4/1988 | Doi et al. | 237/2 A |
| 4,866,365 | 9/1989 | Offiler et al. | 322/8 |
| 4,950,972 | 8/1990 | Berg | 322/8 |
| 4,963,716 | 10/1990 | Van Den Elst et al. | 219/202 |

*Primary Examiner*—Henry A. Bennet
*Attorney, Agent, or Firm*—Russell E. Baumann; René E. Grossman; Richard L. Donaldson

[57] ABSTRACT

A system for heating the passenger compartment of an automotive vehicle has a hot water heater receiving heat from a vehicle engine arranged in series with a self-regulating electrical resistance heater of positive temperature coefficient of resistivity, has a power source for energizing the electrical resistance heater, and has a fan for directing air in heat-transfer relation to the hot water heater and to the electrical resistance heater in sequence to provide a heated air output to the passenger compartment. Fan speed is controlled to regulate the volume of air directed in heat-transfer relation to the heaters so that the electrical resistance heater is promptly and consistently capable of heating that volume of air to at least a selected minimum temperature such as 100° F. as the heated air output is furnished to the passenger compartment, thereby to give a vehicle passenger an immediate and continuing sensation of comfort beginning very promptly after engine start-up even on a very cold day. The fan speed is regulated to provide a large air volume for heating the compartment as quickly as possible with the available power while providing the immediate sensation of comfort to the vehicle passenger. Fan speed is also regulated to limit power consumption by the electrical resistance heater at a level consistent with efficient engine operation under different engine operating conditions and after engine warm-up occurs.

29 Claims, 4 Drawing Sheets

DEFROST AND PASSENGER COMPARTMENT HEATER SYSTEM

BACKGROUND OF THE INVENTION

The field of this invention is that of compartment heaters for automotive vehicles and the invention relates more particularly to a compartment heater system having an electrical resistance heater of positive temperature coefficient supplementing a hot-water-based heater type to more quickly improve passenger comfort after engine start-up on a cold day.

Recent trends toward automotive engines operating with greater efficiencies and lower heat rejection rates have progressively reduced the amount of "waste" heat from the engine available for use for heating the vehicle passenger compartment. At the same time there is a desire to reduce compartment heat-up time and/or to increase passenger compartment temperature. Over the past several years there has been a growing interest not only in improving the performance of currently-used hot-water-based compartment heaters but also to employ supplementary heaters, particularly for supplying heat to the passenger compartment during the engine warm-up period on a cold day when the output from the hot-water-based heater is inadequate. Use of a gasoline-fired preheater has been proposed but is considered to require a relatively bulky, complex and expensive heater structure. Another proposal has been to augment hot-water-based heating of the compartment by use of electrically-heated seats. Again, that approach seems to result in a complex and expensive system. It has also been proposed to add a supplemental electrical resistance heater using self-regulating heater elements of positive temperature coefficient of resistivity. Use of that type of electrical resistance heating to supplement hot-water-based heating has resulted in reductions in compartment heat-up time and has increased steady state passenger compartment temperature where desired. However, it is also found that, where today's automotive vehicles have many different electrically operated components competing for the available electrical power furnished by the vehicle power source, such supplemental electrical resistance heaters frequently cannot be large enough to provide all of the heat which may be desired, particularly during the period immediately after engine start-up on a cold day. Frequently it is found that forced circulation of air through the heating system before engine warm-up occurs can actually detract from passenger comfort by circulating air which is not heated or heated only a few degrees above a cold ambient temperature.

It would be desirable to provide a compartment heater system which can add to passenger comfort in the vehicle compartment substantially immediately after start-up on a cold day while also assuring that the passenger compartment is heated to a desired steady state temperature as rapidly as possible with the available power and while also assuring that the electrical power requirement of the system is properly matched to the available electrical power under all vehicle operating conditions.

BRIEF SUMMARY OF THE INVENTION

It is an object of this invention to provide a novel and improved defrost and/or passenger compartment heater system; to provide such an improved system having an electrical resistance heater of positive temperature coefficient of resistivity arranged to supplement a hot-water-based heater which receives heat from an automotive engine; and to provide such an improved system in which the heat output from the system is regulated to substantially immediately enhance passenger comfort in the compartment and/or to substantially reduce windshield defrost time under most circumstances during the engine warm-up period, to automatically match the power requirement of the electrical resistance heater to the electrical power available for heating purposes under all vehicle operating conditions, and to provide such a system which is compactly and economically accommodated in the space presently allotted for existing vehicle heating systems.

Briefly described, the novel and improved passenger compartment and/or defrost heater system of the invention comprises a first heater such as a hot-water-based heater of conventional type arranged in conventional manner for receiving heat from the vehicle engine. That heater is arranged in series with one or more additional heater means having one or more self-regulating electrical resistance heater elements of positive temperature coefficient of resistivity. A power source such as the vehicle battery and an alternator charging the battery is arranged to electrically energize the electrical resistance heater elements. A fan is arranged to direct a selected flow of air in heat-transfer relation to the first and a second heaters in sequence for heating the air to provide a heated air output to the vehicle passenger compartment for heating the compartment and/or defrosting the vehicle windshield. In accordance with the invention, a control is arranged to regulate the operating speed of the fan so that the volume of heated air output is limited to determine the output air temperature to be at least at a selected minimum temperature level such as 100° F. as it is furnished to the passenger compartment. In that way, the heated air output immediately contributes to the sensation of comfort of passengers in the compartment as soon as the air output from the system is furnished to the compartment promptly after engine start-up. The speed is adapted to be regulated over a substantial range to provide a substantial amount of heated air to the compartment and to achieve a high level of heat output from the electrical heater consistent with maintaining that described minimum air output temperature from the system. In a preferred embodiment of the heater system, a timer delays initiation of fan operation for a brief period of time such as five to twenty seconds after the electrical resistance heater element is energized on start-up of the engine or heater system, thereby to assure that the electrical resistance heater element has reached a temperature high enough to achieve at least the desired minimum air output temperature for the minimum volume of air initially provided by the system. In a preferred embodiment of the heater system, a sensor determines the heated air output temperature and then regulates the fan speed to control air flow through the system to maintain at least the desired minimum heated air output temperature while permitting substantial air flow over the heaters to heat the compartment as rapidly as possible consistent with maintaining the desired minimum temperature. In one preferred embodiment of the invention, the power source provides a first power or voltage output for operating the vehicle engine and a second power or voltage output for operating the heater system, and a power output sensor such as a sensor detecting vehicle battery output voltage regulates the second power output to assure the power source provides the first power output to the other vehicle electrical systems under all engine operating conditions and provides electrical heating of the passenger compartment only when electrical power is available from the power source for that purpose.

DESCRIPTION OF THE DRAWINGS

Other objects, advantages and details of the novel and improved vehicle compartment heater system of the invention appear in the following detailed description of preferred embodiments of the invention, the detailed description referring to the drawings in which.

DESCRIPTION OF PREFERRED EMBODIMENTS

Figure 1:
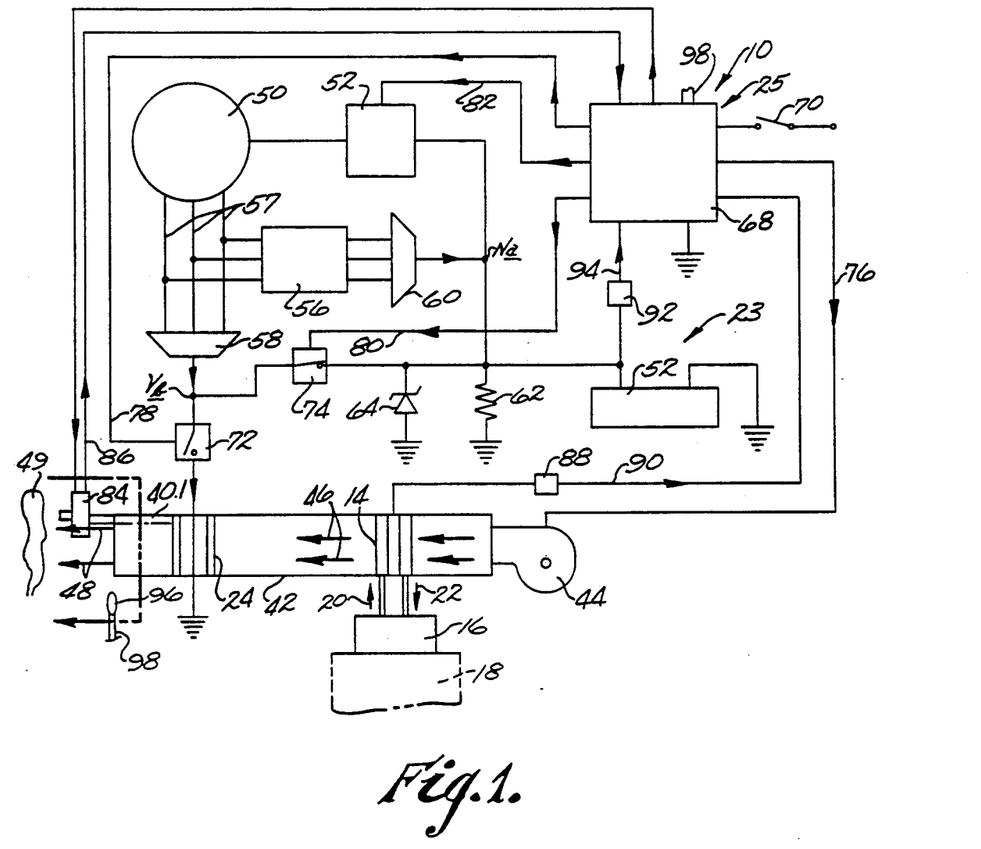
FIG. 1 is schematic view of a compartment heater system according to the invention.

Referring to the drawings, 10 in FIG. 1 diagrammatically illustrates the novel and improved compartment heater system of the invention which is arranged to heat a passenger compartment 12 of an automotive vehicle.

The system includes a first, hot-water-based heater 14 having a heat-exchanger portion for receiving heat from the coolant system 16 of the internal combustion engine 18 of the vehicle. As this first heater is conventional it is not further described and it will be understood that it receives a fluid such as water from the coolant system 16 as indicated by the arrow 20, circulates that fluid within a heat-exchanger of the heater, and returns the fluid to the coolant system as indicated by the arrow 22. As will be understood, the coolant system fluid will be very cold when the engine 18 is first started on a cold day but is gradually heated as the engine warms up, typically over a six minute period or the like, until the coolant fluid ultimately provides a substantial amount of heat to the heat-exchanger in the first heater in well known manner.

Figure 2:
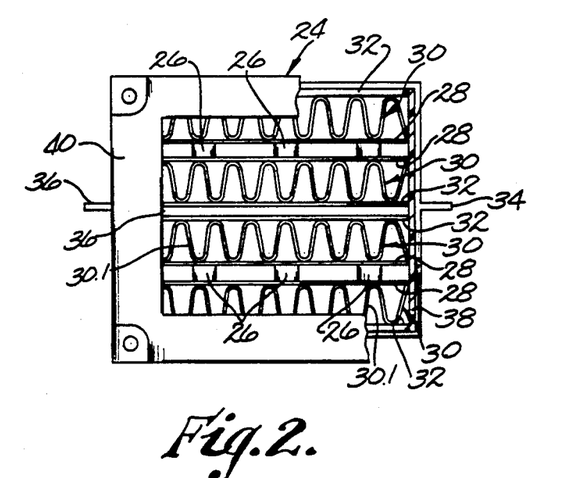
FIG. 2 is a front elevation view, partially cut away, of a self-regulating electrical resistance heater used in the system of FIG. 1.

The system 10 also incorporates a second, preferably self-regulating, electrical resistance heater 24 to supplement the first heater particularly during the period when the engine is warming up. Preferably the second heater comprises one or more electrical resistance heater elements 26 of a ceramic material or the like of positive temperature coefficient of resistivity (PTC) which are individually self-regulating. As shown in FIG. 2, the second heater 24 is also of generally conventional type. Preferably for example, the second heater has a plurality of groups of elements 26 of a ceramic material such as a lanthanum-doped barium titanate or the like, each having metal contact coatings (not shown) on opposite sides of the elements to serve as element electrodes. The groups of elements are disposed between respective pairs of thermally and electrically conductive metal strips 28. Those metal strips each have thermally and electrically conductive fin means 30 mounted on the strips, and similar thermally and electrically conductive metal strips 32 are disposed in electrically conductive relation to the fin means at opposite sides of the fin means. A first terminal 34 is electrically connected to the metal contacts on first sides of the respective PTC elements 26 through a pair of the metal strips 32, a pair of the fin means 30, and a pair of the metal strips 28. A second terminal 36 is electrically connected with the metal coatings or electrodes on opposite sides of the respective elements 26 through another pair of metal strips 32, another pair of fin means 30, and another pair of the metal strips 28, that terminal being electrically insulated from the terminal 34 by an insulator 38 of an organic material or the like. The metal strips, fin means and electrical resistance elements 26 are secured in assembled relation as described by an electrically insulating plastic frame or housing 40 or the like. In that arrangement, the electrical resistance heater elements are electrically connected in parallel relation to be electrically energized and to transfer heat to the metal strips and fin means which serve as heat-exchanger means for transferring heat to air passed through the heater over, between and around the fin means baffles 30.1. If desired, honeycomb PTC heater elements or the like or other heater structures are used to replace the elements 26 and fin means 30 within the scope of this invention.

The first and second heaters 14 and 24 are arranged in series within an automotive air duct system 42 or the like, and a fan 44 is mounted relative to the duct to direct air through the duct in heat-transfer relation to the heat-exchanger means in the first and second heaters in sequence as indicated by arrows 46 in FIG. 1, thereby to provide a heated air output from the system as indicated at 48 to be directed into the passenger compartment 12, preferably to fall directly on a passenger 49 in the compartment. Preferably the electrical resistance heater 24 is disposed at a location as close as possible to an air outlet from the heater duct system 42 and preferably that outlet location is selected to be immediately adjacent to the vehicle operator to direct the air output onto the operator.

Figure 3:
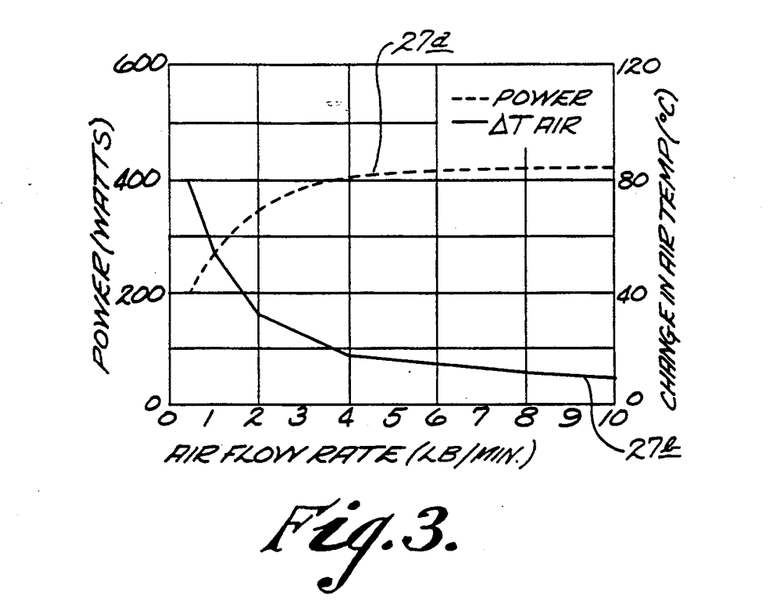
FIGS. 3-5 are graphs illustrating operation of the resistance heater elements used in the system of FIG. 1.
Figure 4:
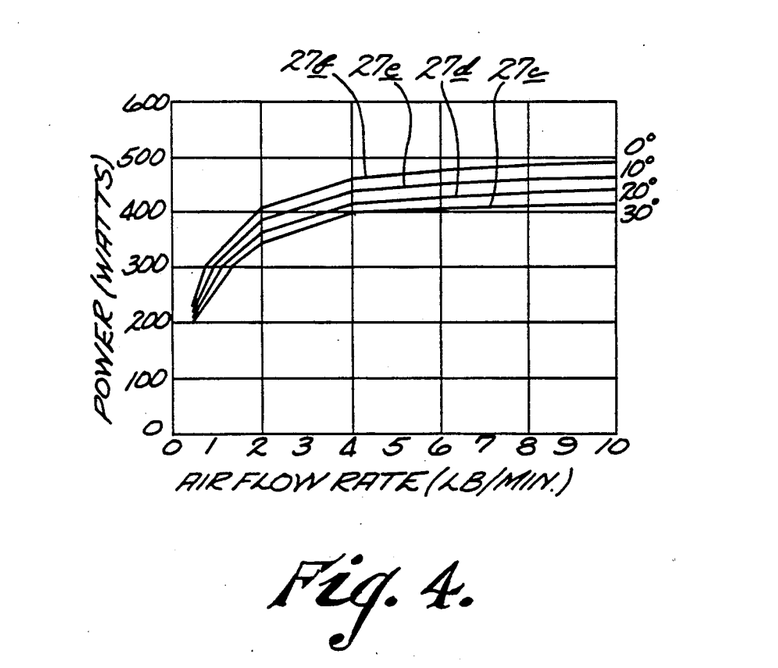
Figure 5:
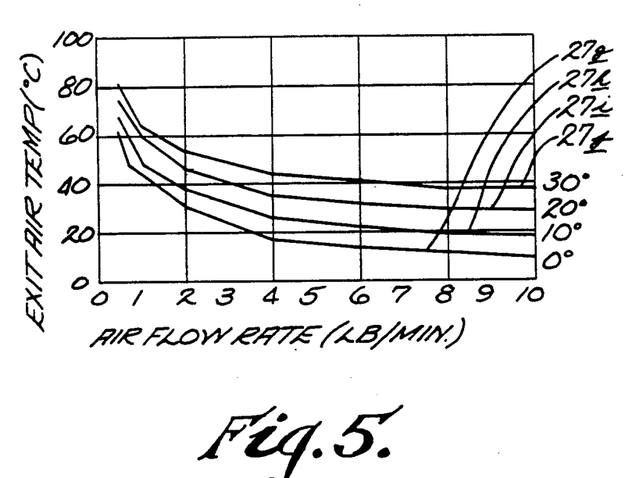

In that regard, the PTC heater elements 26 in the heater 24 are selected to initially display a relatively low electrical resistance at normal room temperature but are adapted to sharply increase in resistance as the elements are self-heated by directing electrical current through the elements. That is, the element materials are selected to display a steeply sloped resistance-to-temperature curve. As the resistance increases and reduces the element current, the elements generate less heat and gradually stabilize at the temperature at which the amount of heat being generated in the elements matches the heat being dissipated from the elements via the fin means 30 for example. When the air directed in heat-transfer relation to the heater 24 by the fan 44 is then increased in volume or decreased in temperature so that the air withdraws more heat from the heater elements 26, the elements respond by decreasing somewhat in temperature and therefore in resistance to generate more heat and restabilize at a typically slightly lower temperature. That is, where the flow of air over a PTC heater means is increased from 0 to 10 lbs./min. for example, power consumption by the heater means tends to increase sharply at first and then to increase at a much slower rate as indicated by curve 27a in FIG. 3. Similarly the temperature of the air-heated by the PTC heater means tends to vary as indicated by curve 27b in FIG. 3 as the heat generated by the heater means is distributed over a larger air volume. Similarly, where the temperature of the air directed on the PTC heater means is decreased from 30° to 0° C. for example as the volume of air passed over the heater means is varied from 0 to 10 lbs./min. as shown in FIGS. 4 and 5, power consumption by the heater means tends to increase with air temperature drop as shown by curves 27c to 27f in FIG. 4 and the temperature of the air as heated by the PTC heater means undergoes a corresponding decrease as indicated by curves 27g to 27j in FIG. 5. Preferably the ceramic material of the elements 26 in the heater 24 is selected to display a Curie temperature in the range from about 120° to 180° C. Such elements are adapted to display relatively low room temperature resistivities on the order of 100 ohm-centimeters or less and to self-heat into a temperature range at which they are adapted to sharply increase in resistance by 10,000 percent or more over a temperature rise of 30°-40° C., whereby the elements vary substantially in power consumption and heat-generating capability as the air 46 directed in heat-transfer relation to the heater 24 by the fan 44 is varied in volume and/or temperature. Preferably the fan speed is adapted to vary air flow over the heaters in the range from 0 to 5 lbs./min. as shown in FIGS. 3-5 for providing maximum change in heat output and power consumption in response to change in fan speed. Preferably the heater 24 is adapted to operate at a power usage level on the order of 1000 to 2000 watts with ambient air temperature at about 20° F. for example while providing 4 to 5 lbs./min. of air to the passenger compartment.

The system 10 further includes a power source 23 for energizing the heater 24 and in accordance with this invention includes a control means 25 for regulating speed of the fan 44 to direct a selected limited volume of air 46 in heat-transfer relation to the first and second heaters in sequence so that the heaters cooperate in providing the heated air output 48 to the passenger compartment at a temperature which is at least equal to a selected minimum temperature sufficient to provide the passenger with a sensation of comfort substantially immediately after the engine 18 is started even on a very cold day. Preferably for example, the control means regulates the fan speed to furnish the heated air output 48 at a temperature which is at or close to body temperature or body skin temperature, preferably at a temperature of about 100° F. for example, to provide a sensation of warmth to the passenger as soon as the system begins to furnish air output to the passenger compartment. For that purpose, the control means also preferably regulates energizing of the heater 24 to be simultaneous with engine start-up or with selective initiation of operation of the system 10 and regulates operation of the fan to begin to circulate air only with a selected delay of five to twenty seconds or the like after engine or system start-up to give the electrical resistance heater 24 time to warm-up to a suitable operating temperature before fan operation begins. Preferably the control means regulates the fan speed over a selected range to furnish as large a volume of heated air output as possible to the passenger compartment consistent with maintaining the air output 48 at least at the selected minimum temperature level, thereby to heat the compartment to a desired temperature level as soon as possible.

The power source 23 preferably comprises components of a generally conventional automotive vehicle power supply including an alternator 50, a voltage regulator 52, and a battery 54 as shown in FIG. 1. For many purposes no more than the conventional automotive power source is use. In a preferred embodiment however, the power source includes a step-down transformer 56 arranged in a conventional way as shown in U.S. Pat. No. 4,866,365 for example so that the power source is adapted to provide first and second power or voltage outputs. Preferably for example, a conventional, high-output, three-phase alternator 50 is arranged in a conventional way to be driven by the engine 18 on start-up of the engine to provide a three phase output voltage 57 at up to about 40 volts AC to an automotive rectifier unit 58 and, through the transformer 56, to the automotive rectifier unit 60. Typically for example the transformer has a 2.86 to 1 step-down ratio so the power source is adapted to provide the first power or voltage output Va at the rectifier 60 at about 14 volts DC and the second power or voltage output Vb at the rectifier 58 at up to 40 volts DC. A conventional 10 volt DC voltage regulator 52 is arranged to regulate operation of the alternator 50 to maintain the first power or voltage output Va for example at substantially the 14 volt DC level to meet the vehicle load requirements as diagrammatically indicated at 62 and to maintain a proper charge level on the battery 54 as protected by the diode 64. If desired, the control 68 described below is adapted to selectively interrupt the alternator field briefly after any operation of the diode to protect the circuit, thereby to reset the diode for further protecting the circuit thereafter. Alternately, if desired, the power source can be provided with just the conventional, single alternator as noted above or preferably with a single larger than usual alternator, or with 2 alternators for the respective power or voltage outputs within the scope of the invention.

In that arrangement, where the heater 14 is normally cold at engine start-up on a cold day and is unable to provide significant heat to the passenger compartment for a substantial time after engine start-up, the electrical resistance heater 24 is adapted to provide a significant heat-output promptly after engine start-up. Subsequently, however, after engine warm-up has occurred, the heater 14 is adapted to provide a substantial heat output and the arrangement of the system permits power consumption by the electrical resistance heater 24 to be automatically reduced to a very low level.

The control means 25 preferably includes a control 68 such as a conventional integrated circuit microprocessor or the like which is preferably arranged to be energized on engine start-up as is diagrammatically indicated by ignition switch 70 in FIG. 1. A selector switch or relay 72 selectively connects the PTC heater 24 to the second power output Vb and a normally closed relay 74 selectively interconnects the two power outputs Va and Vb. The control 68 is adapted to provide a variable voltage to the fan 44 as indicated at 76 to vary the speed of the fan over a selected range to vary the air volume in the range from 0 to 5 lbs./min. for example. The control 68 is also arranged to sense the condition of the selector switch or relay 72 as indicated at 78 and to selectively open the relay 74 as indicated at 80 while relay 72 is closed. Preferably the control is also arranged to monitor operation of the voltage regulator 52 as indicated by the lead 82 which serves to shut off the alternator field while the relays 72 and 76 are being switched. In one preferred embodiment, a thermal sensor 84 of any conventional type is arranged on an extension 40.1 of the heater housing e.g. (see FIG. 1) to detect the temperature of the air output 48 to provide an input signal to the control 68 reflecting the air output temperature as indicated at 86. Preferably an additional thermal sensor 88 provides an input signal to the control 68 reflecting the temperature of the hot-water-based heater 14 as indicated at 90 and, in one preferred embodiment, a current sensor 92 of any conventional type provides an input signal to the control reflecting the level of discharge by the battery 54 as indicated at 94. For example, the sensor 92 comprises a voltage sensor adapted to sense drop-off of battery voltage if idling of the engine permits draw on the battery such that battery voltage falls below 12.5 volts e.g.

In operation of the heating system 10 when the vehicle is in its normal operating mode with the selector switch 72 open, the heater 24 is normally deenergized as shown. In that mode, the power source 23 operates in a generally conventional manner providing 14 volts DC to all vehicle electrical systems represented by the load 62. That is, with the selector switch 72 open, the control 68 maintains the relay 24 closed and feeds voltage Vb to the voltage regulator 52. Due to the step-down transformer 56, the voltage Va is always less than the voltage Vb so that current flow from the rectifier 60 is prevented in this operational mode. Consequently, the regulator 52 regulates voltage Vb to about 14 volts DC and the voltage Vb is applied to the vehicle load 62 for operating all of the vehicle electrical systems in a conventional way. In effect, the rectifier 60 and the transformer 56 do not provide an effective output in this mode, and the control 68 maintains the fan 44 in off condition so that no air output 48 is provided by the system 10.

If the selector switch 72 is operated by the vehicle passenger for energizing PTC heater 24, the control 68 detects or monitors the selector switch condition and opens the relay 74 to isolate the voltage Vb from the voltage regulator. The voltage Va as furnished by the rectifier 60 is then applied to the voltage regulator 52 and the voltage Va is regulated to be at about 14 volts DC for operating the vehicle electrical system 62. As that occurs, the voltage Vb is concomitantly regulated to be at its higher output voltage level at about 40 volts DC for rapidly heating the PTC elements 26 of the heater 24 to the temperature at which they sharply increase in resistance as noted above for achieving controlled heating of the air 46 as described above. The control 68 then initiates operating of the fan 44, preferably with a selected delay on the order of five to twenty seconds after energizing of the heater 24 to permit the heater 24 to be heated to an appropriate operating temperature before the fan directs the air 46 in heat-transfer relation to the heaters 14 and 24.

The control 68 is preferably programmed or otherwise adapted in conventional way to operate the fan at a relatively low initial speed such as 1 lb./min. to direct a selected limited volume or amount of air 46 through the duct 42 so that, even if the selector switch 72 is closed as soon as the engine 18 is started on a very cold day, the heater 24 is itself adapted to substantially immediately heat that initial volume of air to at least the selected minimum temperature noted above as the air passes in heat-transfer relation to the heater 24, whereby the air output 48 is at that desired temperature as it is furnished to the compartment for providing the passenger with a substantially immediate sensation of comfort or warmth. That is, even though the heater 14 is still quite cold within the first few minutes after engine start-up, the capacity of the heater 24 within the few seconds as noted is matched to the initial air volume furnished by the fan to assure that the air output 48 is heated to or above the desired minimum temperature as it is furnished to the compartment.

The control 68 is also programmed or adapted to progressively increase fan speed promptly after fan operation is initiated for tending to provide a progressively increasing volume of air 46, such as 1 lb./min. increase every four to forty 5 seconds up to about 5 lbs./min., the high fan speed, through the duct 42 for rapidly heating the passenger compartment to a desired temperature. In the preferred embodiment of the invention, the thermal sensor 84 preferably detects the temperature of the air output 48 as it is initially furnished to the compartment and provides a signal to the control 68 reflecting that temperature so that the control limits the fan speed if the increasing volume of air being directed over the heaters 14 and 24 in sequence tends to result in the air output 48 being below the desired minimum temperature. As warm-up of the engine then continues so that the heater 14 begins to contribute to heating of the air 46 as will be understood, the air 46 as partially heated by heater 14 tends to withdraw less heat from the heater 24 and the heater 24 tends to increase somewhat in temperature and resistance for progressively reducing power consumption by the heater 24 as above described. In that way, the heater 24 automatically adjusts in power consumption and heat output to the level necessary for supplementing the hot-water-based heater 14. If desired, the control 68 is also adapted to respond to the air output temperature as sensed by the sensor 84 to increase air volume to prevent an excessive air output temperature. In an alternate embodiment of the system, the sensor 84 is omitted, and the control 68 is programmed or otherwise adapted to progressively increase the fan speed at a predetermined rate, that rate being selected such that the heater 24 is continuously capable of providing sufficient heat to the increasing volume of air 46 to supplement the progressively increasing heat provided by the heater 14 to maintain the air output temperature at least at the desired minimum temperature level under any ambient temperature conditions likely to be encountered.

In one preferred embodiment of the invention, the heaters 14 and 24 are arranged to cooperate so that, when the engine is fully warmed up, the heater 14 is adapted to warm to a sufficient extent to heat the air 46 to a temperature at which the power consumption by the heater 24 is reduced to a very low level under any ambient temperature condition likely to be encountered. In an alternate embodiment, where the engine is not expected to fully meet requirements for heating the passenger compartment on some very cold days, the heater 24 is proportioned to function as above described to automatically provide a sufficient amount of heat as regulated by the sensor 84 for supplementing heat output by the heater 14. In another preferred embodiment, where the thermal sensor 88 provides an output signal to the control 68 indicating that the engine is in fully warmed-up condition, the control 68 is programmed to reopen the relay 72 to deenergize the heater 24 when the sensor 88 indicates that operation of that heater is no longer needed to supplement heater 14. In another alternate embodiment of the system 10, an additional, adjustable thermostat 96 or the like of any conventional type is arranged to provide an input signal to the control 68 reflecting the overall temperature within the passenger compartment and the control 68 is programmed to discontinue fan operation and/or deenergize the heater 24 if passenger compartment temperature reaches the desired temperature set by the thermostat 96.

In one preferred embodiment of the invention, where the sensor 92 is arranged to provide a signal to the control 68 reflecting a battery condition, e.g. that the battery 54 is being discharged to an excessive extent, the control 68 is arranged to reduce speed of the fan 44 for reducing power consumption by the heater 24 whenever the battery condition indicates the reduction of power consumption by the heater would be desirable. For example, the control 68 is adapted to reduce fan speed if sensor 92 indicates that battery voltage has fallen below a selected level or discharge current from the battery exceeds a selected level. In that arrangement, if the engine is operated in idle condition or the like so that the alternator is unable to provide the full level of power necessary for operating both the vehicle electrical system 62 and the heater 24 and would tend to result in excessive drain of charge from the battery, the control 68 reduces fan speed to reduce power consumption by the heater 24 to a tolerable level. It should be understood that the fan speed is adapted to be regulated relative to the power consumption by the self-regulating heater in the various ways as above described independent of maintaining a minimum heated air-output temperature within the scope of this invention.

Figure 6:
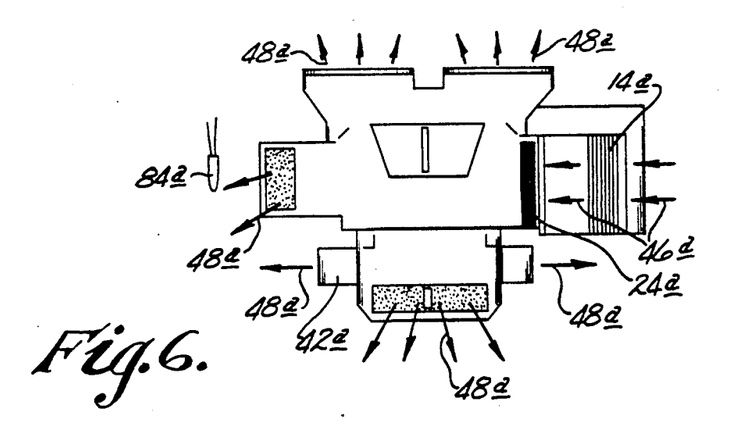
FIGS. 6-8 are diagrammatic views illustrating alternate embodiments of the systems of the invention.
Figure 7:
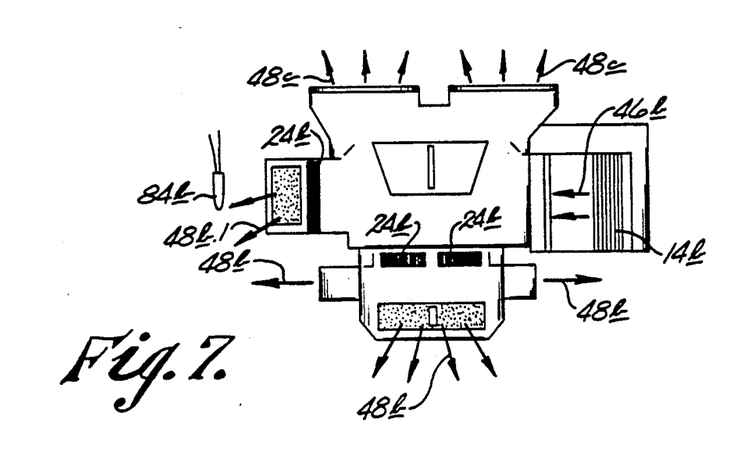

In one preferred embodiment of the invention as illustrated in FIG. 6, wherein similar similar components are identified with similar similar reference numerals, a heater duct 42a is provided with multiple air outputs 48a and heaters 14a and 24a are arranged in an entry opening of the duct as shown in FIG. 6 to receive air 46a in sequence as shown in FIG. 6 so that all air outputs 48a are correspondingly heated. In that arrangement, a sensor 84a is preferably arranged to detect the temperature of a selected one of the air outlets preferably the one closest to the compartment passenger operating the vehicle. In another preferred embodiment of the invention as shown in FIG. 7, wherein similar components are also identified with similar reference numerals, a similar heater duct 42b has a hot-water-based heater 14b arranged in an entry opening of the duct as shown in FIG. 7 and has multiple electrical resistance heaters 24b arranged in respective ones of a plurality of openings for air outputs 48b, 48b.1 from the duct. If desired, a resistance heater is omitted from one or more of the openings for an air output 48c for example for optimizing availability of heat at one air output 48b.1 for example for providing an immediate sensation of comfort to the passenger at that one location in the compartment. As will be understood, a thermal sensor 84b is preferably arranged to respond to temperature of the air output 48b.1 at that selected air output opening as shown in FIG. 7.

Figure 8:
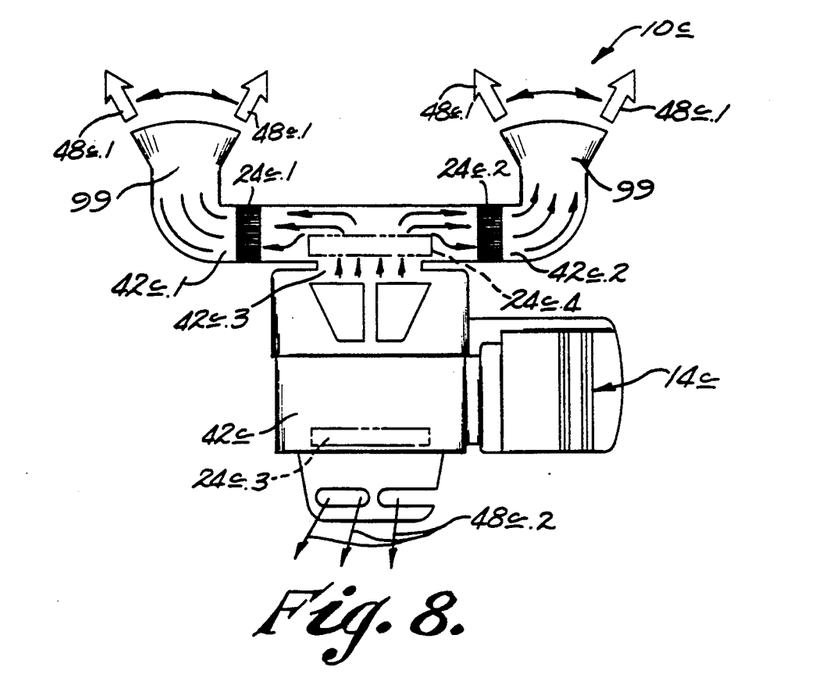

In another alternate preferred embodiment 10c of the invention as illustrated in FIG. 8, wherein similar components are identified with similar reference numerals, the heater duct 42c comprises a duct of known type which is so proportioned that fluid flow in one or more selected portions of the duct constitute a substantially laminar fluid flow. Such ducts are commonly used with one or more defrost nozzles 99 which are commonly called fluidic nozzles for achieving greater efficiency in desired defrost air flow patterns on vehicle windshields in vehicle defrost systems or the like by moving a stream of defrost air or the like progressively back and forth over windshield. For example, where the duct 42c is provided with two fluidic nozzles 99, the duct portions 42.c1, 42.c2 and 42.c3 for example, are typically proportioned in the duct to provide substantially laminar air flow leading to the nozzles close or immediately adjacent to the nozzles. In accordance with this invention PTC heater means 24c.1, 24c.2 of type described above, including heaters as shown in FIG. 2 or the like or those with PTC honeycomb elements or the like, are preferably positioned within the duct portions 42c.1 and 42c.2 which are typically of rectangular of circular cross section, for example and are adapted to pass the air flow 46 through the heaters 24c.1 and 24c.2 to the fluidic nozzles free of significant interference with air flow and with virtually no detrimental effect on the defrost air flow patterns or the like achieved by the nozzles while enhancing heating of the air output 48c.1 from the nozzles. That is, the distinctive air flow resulting from that heater positioning, if any, is tolerated by such know duct types. As shown the heaters 24c.1 and 24c.2 are preferably arranged in sequence with a hot water based heater 14c as previously described and preferably at least one additional heater 24c.3 is arranged in an outlet adjacent the vehicle passenger so that the air output 48c.2 for that outlet is provided with the desired minimum temperature as described above. In an another alternate embodiment the heaters 24c.1 and 24c.2 are replaced by a corresponding heater 24c.4 in another laminar flow portion 42c.3 of the duct. Of course, the heaters 24c or the like are adapted to be located in the laminar flow portions of the duct 42c independent of the heater 14 or control 68 within the scope of the invention.

Figure 9:
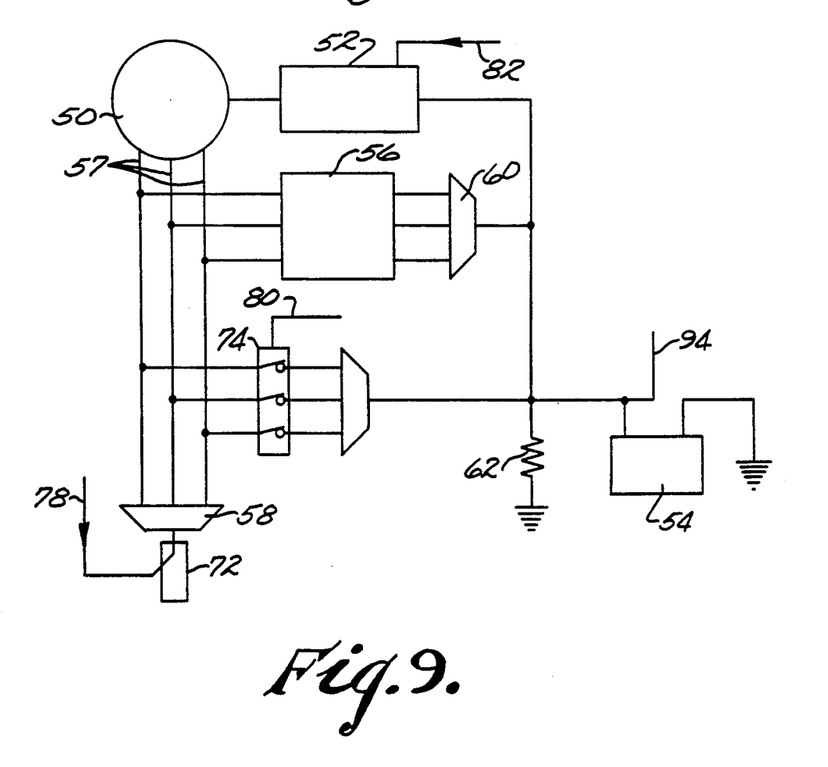
FIG. 9 is a partial schematic view similar to FIG. 1 illustrating an alternate preferred embodiment of the invention.

In another preferred embodiment as illustrated in FIG. 9, wherein comparable components are identified with corresponding reference numerals, the protection function performed by the diode 64 in the circuit of FIG. 1 is performed by an additional rectifier unit 100 comparable to the rectifier unit 60 except that the additional rectifier 100 is in the alternating current portion of the circuit, the switch 74 being arranged as a three phase switch. In that arrangement the rectifiers 60 and 100 are standard 14 volt units comprising conventional zener diode means having breakdown voltage in the 24 to 28 volt range while the rectifier 58 embodies corresponding zener diode means having breakdown voltages in the 45 to 50 volt range whereby those zener diode means in rectifiers 100 and 58 provide appropriate load drop protection to ground in respective operational modes of the system while each being adapted to be automatically reset after providing protection against a voltage surge or the like.

It should be understood that although particular embodiments of the invention have been described by way of illustrating the invention, the invention includes all modifications and equivalents of the disclosed embodiments falling within the scope of the appended claims.

We claim:

1. A system for providing heat to a vehicle defrost or a passenger compartment comprising a heater comprising a self-regulating electrical resistance heater of positive temperature coefficient of resistivity, a power source to electrically energize the heater, means directing air in heat-transfer relation to the heater to provide a heated air output to the passenger compartment, and means for varying the amount of air directed in heat-transfer relation to the heater for regulating the amount of air with respect to the self-regulated temperature of the heater to provide the air output to the passenger compartment at a temperature at least equal to the selected minimum temperature at any ambient temperature over a selected range.

2. A system according to claim 1 wherein the means directing air comprises a fan.

3. A system according to claim 2 wherein the means for varying the amount of air directed in heat-transfer relation to the heater comprises means for regulating fan speed.

4. A system according to claim 3 wherein the means for regulating fan speed comprises means detecting the air output temperature, and means for adjusting fan speed relative to the detected air output temperature to maintain the air output temperature at least equal to said selected minimum temperature.

5. A system according to claim 4 wherein the fan is operable at speeds over a selected range and the means for adjusting fan speed adjust fan speed to the maximum speed in the selected range consistent with providing the air output at a temperature at least equal to said selected minimum temperature.

6. A system according to claim 5 wherein the means for adjusting fan speed comprises a timer for initiating fan operation at a low initial speed and for progressively increasing fan speed over the selected range at a selected rate to permit detection of the air output temperature and adjustment of fan speed to maintain the air output temperature at least equal to said selected minimum temperature at any ambient temperature likely to be encountered.

7. A system according to claim 1 wherein the power source provides a first output for meeting requirements of a vehicle load for operating the vehicle and additional power output for electrically energizing the heater, the system having means for limiting power consumption by the heater to assure availability of sufficient power for meeting requirements of the vehicle load under varying engine operating conditions.

8. A system according to claim 7 wherein the power source comprises a battery and the means for limiting power consumption by the heater comprise means for sensing a discharge rate of the battery.

9. A system according to claim 6 wherein the power source provides a first output for meeting requirements of a vehicle load for operating the vehicle and additional power output for electrically energizing the heater, the system having means for limiting power consumption by the heater to assure availability of sufficient power for meeting requirements of the vehicle load under varying engine operating conditions.

10. A system according to claim 9 wherein the power source comprises a battery, and the means for limiting power consumption by the heater comprise means for sensing a discharge rate of the battery.

11. A system for heating a vehicle passenger compartment according to claim 1 wherein the amount of air directed in heat-transfer relation to the heater provides the air output to the passenger compartment at a temperature of at lest about 100° F.

12. A system for heating a passenger compartment of a vehicle having an internal combustion engine comprising a first heater for receiving heat form the engine, a second heater comprising a self-regulating electrical resistance heater of positive temperature coefficient of resistivity, a vehicle power source for energizing the second heater, means directing air in heat-transfer relation to the first and second heaters in sequence to provide a heated air output to the passenger compartment, and means for regulating the amount of air directed in heat-transfer relation to the heaters relative to the temperatures of the heaters to provide the air output to the passenger compartment at a temperature at least equal to a selected minimum temperature.

13. A system according to claim 12 wherein the amount of air directed in heat-transfer relation to the heaters in sequence provides the air output to the passenger compartment at a temperature of at least about 100° F.

14. A system according to claim 12 wherein the means for regulating the amount of air directed in heat-transfer relation to the heaters in sequence regulates the amount of air with respect to the self-regulated temperature of the second heater to provide the air output to the passenger compartment at a temperature at least equal to the selected minimum temperature at any ambient temperature over a selected range.

15. A system according to claim 14 wherein the means directing air comprises a fan.

16. A system according to claim 15 wherein the means for regulating the amount of air directed in heat-transfer relation to the heaters in sequence comprises means for regulating fan speed.

17. A system according to claim 16 wherein the means for regulating fan speed comprises means detecting the air output temperature, and means for adjusting fan speed relative to the detected air output temperature to maintain the air output temperature at least equal to said selected minimum temperature.

18. A system according to claim 17 wherein the fan is operable at speeds over a selected range and the means for adjusting fan speed adjust fan speed to the maximum speed in the selected range consistent with providing the air output at a temperature at least equal to said selected minimum temperature.

19. A system according to claim 18 wherein the means for adjusting fan speed comprises a timer for initiating fan operation at a low initial speed and for progressively increasing fan speed over the selected range at a selected rate to permit detection of the air output temperature and adjustment of fan speed to maintain the air output temperature at least equal to said selected minimum temperature at any ambient temperature likely to be encountered.

20. A system according to claim 16 wherein the means for adjusting fan speed comprises a timer for initiating fan operation at a low initial speed and for progressively increasing fan speed over the selected range at a selected rate to permit detection of the air output temperature and adjustment of fan speed to maintain the air output temperature at least equal to said selected minimum temperature at any ambient temperature likely to be encountered.

21. A system according to claim 12 wherein the power source provides a first output for meeting requirements of a vehicle load for operating the vehicle and additional power output for electrically energizing the second heater, the system having means for limiting power consumption by the second heater to assure availability of sufficient power for meeting requirements of the vehicle load under varying engine operating conditions.

22. A system according to claim 21 wherein the power source comprises a battery, and the means for limiting power consumption by the heater comprises means for sensing a discharge rate of the battery.

23. A system according to claim 19 wherein the power source provides a first output for meeting requirements of a vehicle load for operating the vehicle and additional power output for electrically energizing the second heater, the system having means for limiting power consumption by the second heater to assure availability of sufficient power for meeting requirements of the vehicle load under varying engine operating conditions.

24. A system according to claim 23 wherein the power source comprises a battery, and the means for limiting power consumption by the heater comprises means for sensing a discharge rate of the battery.

25. A system according to claim 12 having an air duct having an air inlet to the duct and a plurality of air outlets from the duct into the passenger compartment and having the first and second heaters arranged in the air inlet for conducting air in heat-transfer relation to the first and second heaters in sequence and for furnishing the heated air output to a plurality of locations in the passenger compartment from a plurality of the air outlets from the duct.

26. A system according to claim 12 having an air duct having an air inlet to the duct and a plurality of air outlets from the duct into the passenger compartment, having the first heater arranged in the air inlet, having a plurality of second heaters arranged in respective ones of the outlets for furnishing the heated air output to a plurality of locations in the passenger compartment from a plurality of air outlet from the duct.

27. A system according to claim 26 having at least one additional air outlet from the duct free of a second heater for directing into a selected location in the passenger compartment free of heating by a second heater.

28. A system according to claim 12 having a duct conducting the air in heat-transfer relation to the first and second heaters in sequence, the duct having at least one duct portion in which said air is conducted with substantially laminar air flow through the duct portion and the second heater being disposed in said one duct portion to transfer heat to the air free of significant interference with air flow through the duct.

29. A system according to claim 28 wherein the duct has fluidic defrost nozzle means directing the heated air output in a preferred air flow pattern from the nozzles and said one duct portion is arranged to furnish air to the nozzles with said substantially laminar flow thereof.

* * * * *